Figure 1:
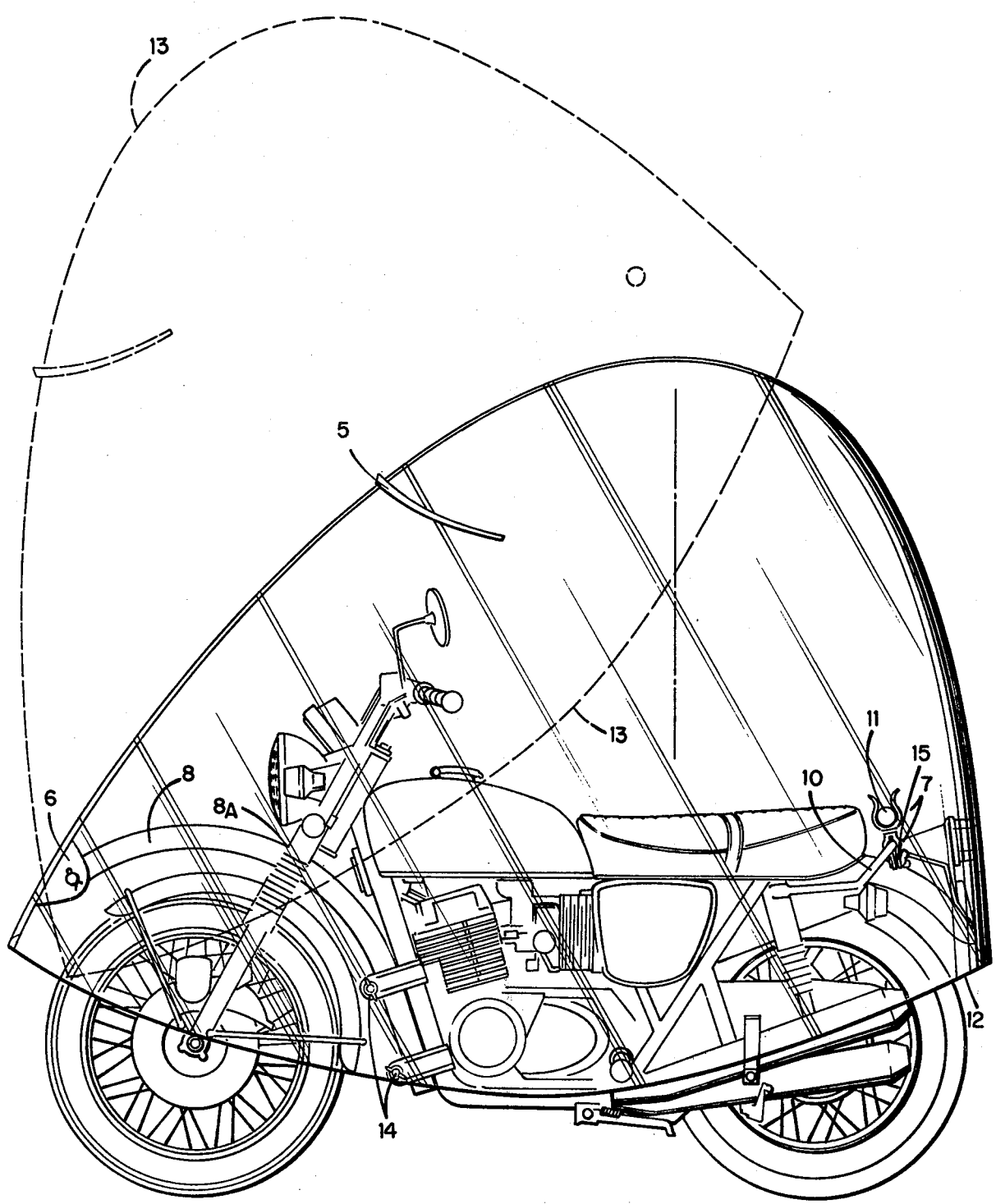

United States Patent [19]
Kelley

[11] 3,979,147
[45] Sept. 7, 1976

[54] TRANSPARENT COVER WITH CONNECTING DEVICES FOR MOTORCYCLES AND RIDERS

[76] Inventor: Robert F. Kelley, 247 Humphrey St., Marblehead, Mass. 01945

[22] Filed: Mar. 14, 1975

[21] Appl. No.: 558,552

[52] U.S. Cl............................ 296/78.1; 280/289 S
[51] Int. Cl.².................................. B62T 17/00
[58] Field of Search.................. 296/78.1, 78 R; 280/289

[56] References Cited
UNITED STATES PATENTS
3,659,872   5/1972   Wainer ......................... 296/78.1 X FOREIGN PATENTS OR APPLICATIONS
518,950   1/1921   France ............................. 296/78.1
851,164   10/1952  Germany ......................... 296/78.1
528,750   6/1955   Italy ................................. 296/78.1
542,416   12/1954  Italy ................................. 280/289

*Primary Examiner*—Robert J. Spar
*Assistant Examiner*—Donald W. Underwood

[57] ABSTRACT

A fully manually detachable rigid transparent cover and two fully manually detachable Connecting Devices, which, together form and provide extensive all-weather and cosmetic protection to and for a motorcycle and rider(s).

2 Claims, 3 Drawing Figures

U.S. Patent   Sept. 7, 1976   Sheet 2 of 2   3,979,147

TRANSPARENT COVER WITH CONNECTING DEVICES FOR MOTORCYCLES AND RIDERS

BACKGROUND OF THE INVENTION

1. Field of the Invention

The present Invention relates to a rigid cover, transparent and fully attachable/detachable. It is open at the bottom, only, and is attached to and swivels upon a Front Connecting Device, and is further attached and stabilized by a Rear Connecting Device. In use, the transparent Cover (hereafter called a Bubble-Cover) rests upon the Front Connecting Device's extreme forward portion and upon the Rear Connecting Device.

2. Description of the Prior Art

The last major problem facing the use of, and marketing of motorcycles for mass consumer use, is that of providing the rider(s) with a light and easily removeable extensive all-weather and cosmetic protective device from wind, rain, snow and splashings from other vehicles. In the past a variety of shields have been patented and/or provided for the hands, face, feet or a combination thereof. These have failed of mass consumer acceptance since:

a. They are not fully detachable without tools.
b. They require what owners and riders feel is an excessive amount of time to remove.
c. They do not provide sufficient weather and cosmetic protection in view of their cost and complexity.
d. They are so designed as to intrude into the psychological freedom inherent in the use of a motorcycle.
e. They impede visability in the course of their protective action.
f. They do not improve upon the safety of the rider(s).

To overcome these shortcomings, the present invention provides:

a. Fully detachable without tools.
c. Extensive all-weather and cosmetic protection using only three major components.
d. One hundred percent transparency, horizontal and vertical, providing the psychological freedom desired.
e. Full protective cover without impeding visability.
f. Full bodily protection.

In addition, the continuing rise in basic fuel prices, localized fuel shortages, the rising costs of maintaining four-wheeled vehicles together with the revolutionary change in what was considered culturally accepted consumer buying habits of that segment of the population most able to expend income for personal transportation - all lead to an increased demand for economical means of personal transport by those who chose to ignore, by financial or cultural desires, the utilization of motorcycles in the past.

FIG. 1. Side Views: Closed and Open Positions
FIG. 2. Quarter View: From Beneath
FIG. 3. Front Connecting Device: Forward Portion Detail

THE INVENTION IN DETAIL (References Are To Illustrations)

The present Invention utilizes the construction of contemporary motorcycles for its utility and method of attachment. The use of the Invention does not intrude upon the mechanical operation of a motorcycle.

Figure 2:
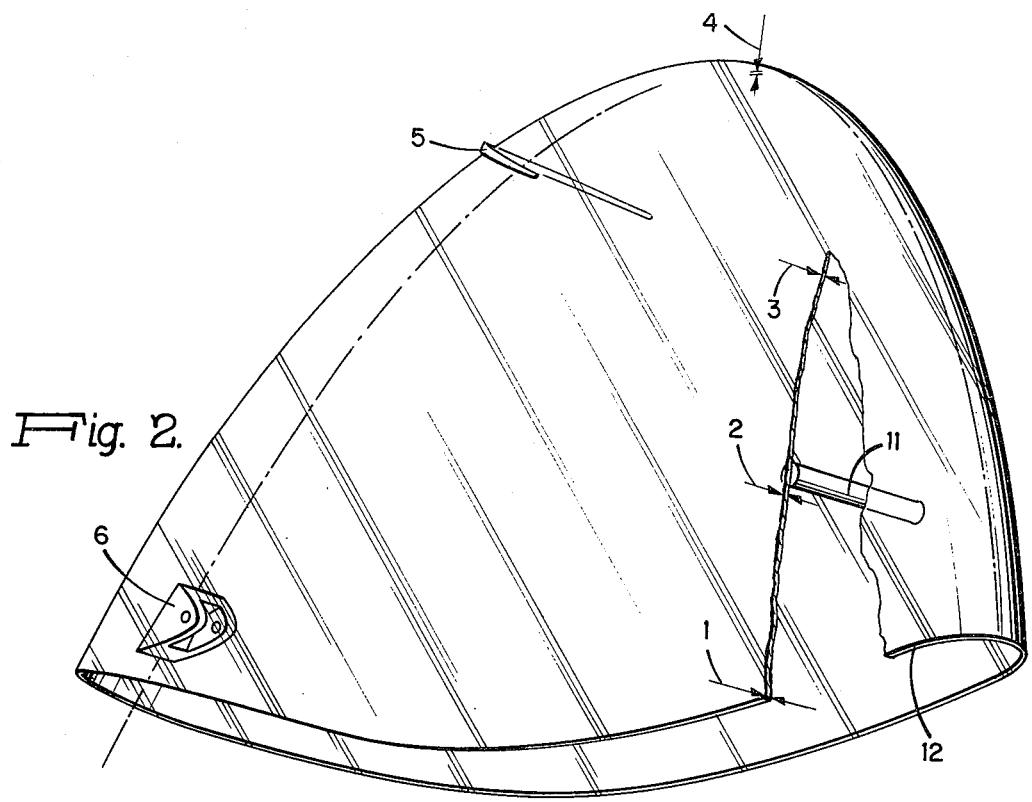

The Inventive combination consists of a rigid transparent, semi-domed shaped Bubble-Cover FIGS. 1 & 2 open at the bottom, made of thermoplastic or acrylic plastic, varying in thickness from one-half inch at and near the bottom 1, to one-fourth inch 2, to one-eigth inch 3, to one-sixteenth inch 4, a Front Connecting Device 6, 8, 8a, 14, which contains a swiveling pin, and a Rear Connecting Device 7, containing pressure clamps, which combination forms the Invention.

The Bubble-Cover's thickness thus varies from one-half inch at the bottom next to the roadway, to one-fourth inch at a level with the rider's waist, to one-sixteenth inch at the shoulders and above. This change in thickness is required to provide a lower center of gravity for road operation as well as to insure optical clarity of the Bubble-Cover in the manufacturing process.

In forward movement, the aerodynamic design and construction of the Bubble-Cover FIGS. 1 & 2 together with the extremely low cooefficient of friction for thermoplastic, together with the strip of rubber 5, which serves as a water ridge, negates the need for windshield-wipers. A light coating of clear oil applied to the area of the Bubble-Cover's exterior surface at a level with the operator's face, will increase the viscosity of the rain water striking the Bubble-Cover. This water ridge 5 is composed of a strip of rubber or rubber-like material measuring 24 inches long, one-half inch wide and one-half inch thick. It is attached to the front of the Bubble-Cover on the external surface, at a level 5 with the rider's shoulders preventing the vertical run of water on the external surface of the Bubble-Cover due to forward movement.

Sufficient space is provided in the design of the Bubble-Cover at its front end FIG. 2 for the front wheel of the motorcycle to be swung right or left to make normal turns while the motorcycle is in forward motion, standing still or being backed-up.

The Bubble-Cover is attached to the motorcycle at two places- the front 6 and the rear 7. The Front Connecting Device's major component consists of a goosenecked-shaped, hollow metal tube, oval in cross-section 8, approximately 3 feet long, which extends from its attachment via two pressure clamps 14 to the frame of the motorcycle 14 thence through and between 8a the front forks of the motorcycle to a point approximately 8 inches forward of, and ten inches above 6 the front wheel. At this extreme forward end of the goosenecked-shaped tube, which forms the major part of the Front Connecting Device, and attached to the internal surface of the Bubble-Cover is a knob 6 containing a swivel pin and a cotter pin 9. This knob 6 may be made of any material which is attachable to thermoplastic and can withstand temperatures of, and changes from minus 30°below zero Farenheit to 180°above zero Farenheit.

The Rear Connecting Device 7 consists of two pressure clamps, spot welded head-to-head, the bottom of the two is clamped with a butterfly nut to the standard "grab bar" 10 on the rear of the motorcycle seat. The open-ended pressure clamp of the Rear Connecting Device 7 acts to engage and disengage a strut-brace 11, which is placed laterally inside the Bubble-Cover, and whose ends are attached to the internal surface of the Bubble-Cover on either side approximately 12 inches from the rear and 18 inches from the bottom of the Bubble-Cover.

To enter or exit the motorcycle with the Bubble-Cover attached the operator approaches the motorcycle in a normal fashion from either side, grasps the bottom edge of the Bubble-Cover at a point near its rear 12, raises the Bubble-Cover 6 inches manually to effect dis-engagement of the struct-brace 11 with the open-ended top pressure clamp 7 of the Rear Connecting Device 7 and continues to raise the Bubble-Cover until the position 13 is reached. Thus, the Bubble-Cover has been swiveled upon the knob 6 of the Front Connecting Device. At this raised or open position 13 the operator/rider then allows the Bubble-Cover to descend around himself, letting it drop sufficiently to effect re-engagement of the struct-brace 11 with the open-ended top pressure clamp 7 of the Rear Connecting Device.

In the open position 13 the Bubble-Cover provides vertical weather and cosmetic protection while the operator is entering or exiting. Entry and exit time is not dependent upon physical strength; it is dependent upon physical coordination to the same manner and degree as the opening and closing of an automobile door. The Bubble-Cover weighs approximately 60 pounds; the fulcrum weight thus raised is about 20 pounds.

The steep sides of the Bubble-Cover FIGS. 1 & 2 prevent the accumulation of snow. Side winds and the breeze created by the passing of other vehicles will be a matter of balance correction, as they are without the Bubble-Cover attached. The center of gravity of the Bubble-Cover will be at the rider(s) knee(s). This low center of gravity and the aerodynamic shape of the Bubble-Cover FIGS. 1 & 2 will minimize the wind effect on the surface of the Bubble-Cover.

The Bubble-Cover, the Front Connecting Devices and the Rear Connecting Device are removed thus:

The operator will grasp the bottom edge of the Bubble-Cover 12 as if to enter, raising the Bubble-Cover only enough to dis-engage the top pressure clamp of the Rear Connecting Device 7 from the internal strut-brace 11. The operator will then reach under and beneath the front of the Bubble-Cover and remove the cotter-pin and the swivel-pin from the knob 6. The entire Bubble-Cover can now be lifted free of the motorcycle FIG. 2. The goose-necked-shaped tube 8 of the Front Connecting Device is removed by untightening the butterfly nuts of the pressure clamps holding it to the frame 14 of the motorcylce. The Rear Connecting Device is removed by removing the butterfly nuts 15 connecting the bottom pressure clamp 15 to the grab bar 10.

Method Of Manufacturing

The major component of the present Invention is the rigid transparent Bubble-Cover FIG. 2, which is formed by the application of a vacuum press mold acting upon a sheet of thermoplastic or acrylic plastic, whose original thickness before forming would be one-half inch to five-eighths inch, in a heated environment between 290° F and 300° F. Molds must be of sufficient smoothness to effect optical clarity in the forming process. Minor blemishes in the surface of the Bubble-Cover may be buffed away.

Figure 3:
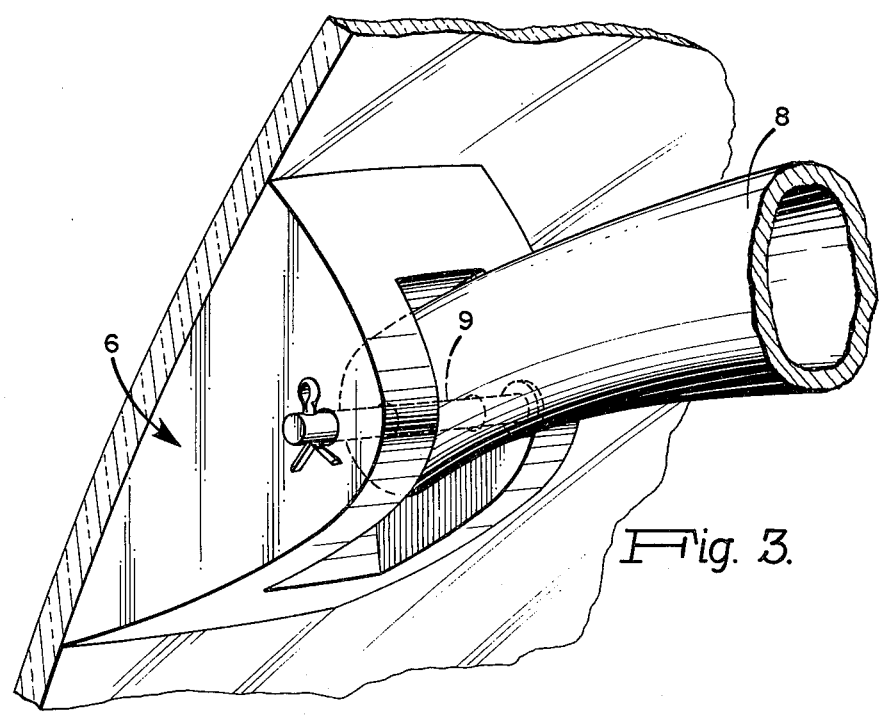

The weight foot/pound/seconds acting upon the swiveling of the Bubble-Cover at the knob end 6 of the Front Connecting Device requires a steel tube or other metal or alloy with equal strength, with a wall thickness FIG. 3 no less than three-eighths inches, and of oval cross-section FIG. 3 with a long axis of 3 inches and a width axis of 2½inches.

There is 9 inches difference in total length between the smallest and largest stock standard street-designed motorcycles. A length of 8 and ½ feet for the overall length of the Bubble-Cover will allow it to fit all such standard stock motorcycles. Any excess length will appear at the rear of the motorcycle.

Changes in the design of the component parts of the present Invention, their location, shape, configuration or combinations will be considered as integral parts of the present Invention and fall within its scope and Patent.

What is claimed is:

1. A full Cover, providing cosmetic and weather protection for motorcycle and riders at rest or in motion, comprising:
    a rigid, transparent, thermoplastic, semidomed shaped full Cover of sufficient size to cover a motorcycle with rider;
    said Cover containing a struct-brace, running laterally within the interior of the Cover, which struct-brace is attached at its ends to the interior side surfaces of the Cover at its rearward portion, which struct-brace engages and disengages the topmost clamp of
    a Rear Connecting Device, consisting of two pressure clamps attached head-to-head of which the bottommost clamp is attached to a standard grab-bar of a motorcycle thus providing a rearward attachment and stabilization device to coincide with
    a Front Connecting Device consisting of a goose-necked shaped tube, oval in cross-section, which tube is attached, by means of clamps, at its rear lower end to the frame of a motorcycle directly in front of the motorcycle's engine; such tube projects forward through and between the space between the front forks of the motorcycle's front wheel; the tube arcs to a point above and forward of the front wheel, at which point the tube is connected via a swivel arrangement to a knob, which knob is also attached to the front interior surface of the aforementioned Cover, thus allowing the Cover to be raised or lowered for rider entry or exit while a motorcycle with Cover is at rest.

2. A rain resister, consisting of a strip of rubbery material, placed and attached horizontally on the exterior surface of the front of the Cover set forth in claim 1, which rain resister prevents the vertical run of rain water on the Cover's surface due to air pressure while the motorcycle with Cover is in motion.

* * * * *